UNITED STATES PATENT OFFICE.

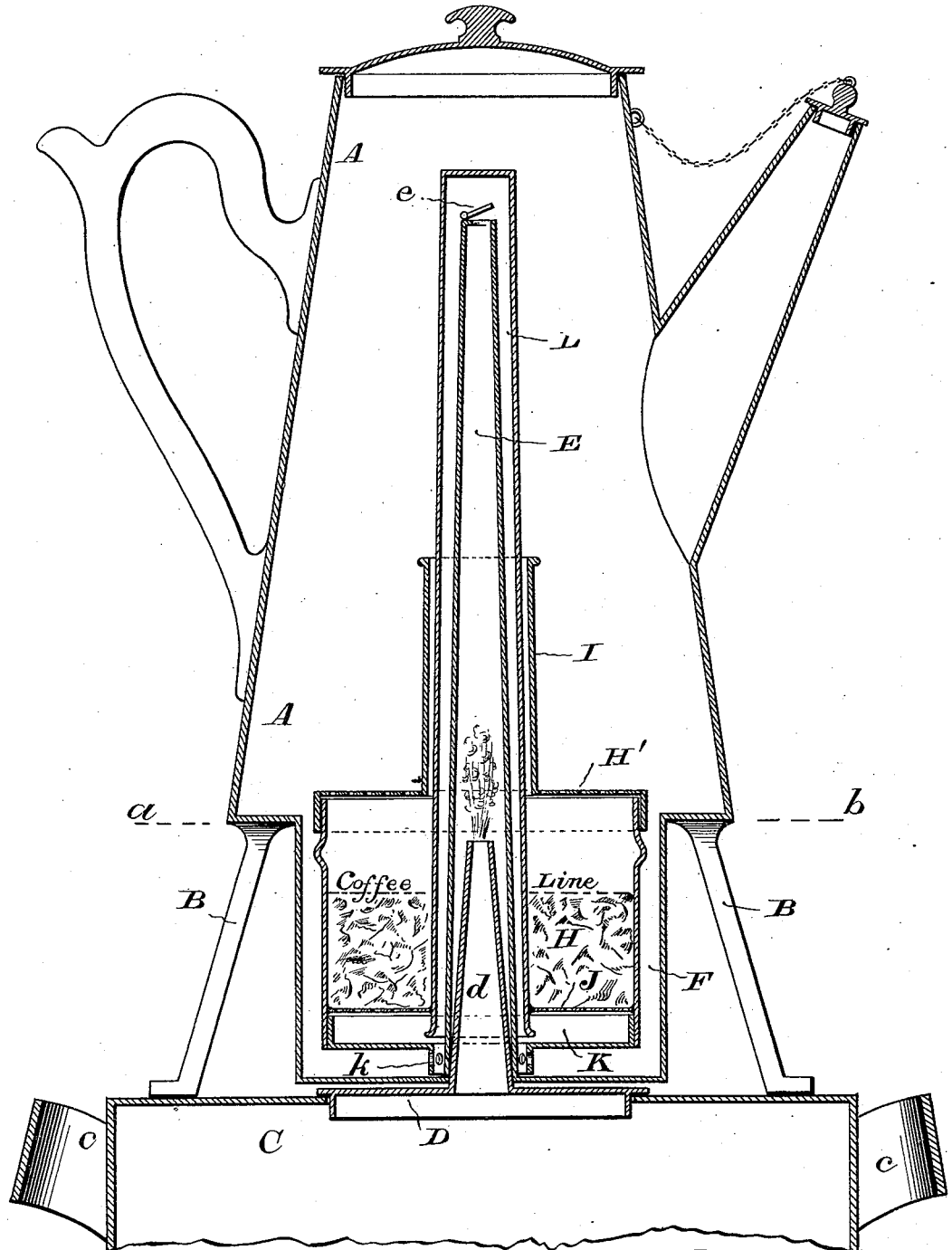

TYRE A. BYLER, OF SAN FRANCISCO, CALIFORNIA.

COFFEE-POT.

SPECIFICATION forming part of Letters Patent No. 313,469, dated March 10, 1885.

Application filed October 30, 1884. (No model.)

*To all whom it may concern:*

Be it known that I, TYRE A. BYLER, a resident of San Francisco, State of California, have invented an Improved Coffee-Pot, of which the following is a specification.

My invention, though more particularly relating to the brewing of coffee, may be used for other analogous purposes.

It consists in a peculiar construction and combination of parts by which, in connection with an ordinary coffee-pot, a constant percolation of steam and water, gradually increasing in temperature, is obtained through a charge of ground coffee retained in a chamber at near the bottom of the pot, the percolation being allowed to proceed until the entire essence of the coffee is extracted from the ground particles.

In the accompanying drawing, forming part of this specification, the figure is a sectional elevation, and as all the parts are cylindrical in form this figure completely illustrates the invention, letters being marked upon it which are referred to below.

In the figure, A is the coffee-pot, ordinarily shaped as far down as the line $a\,b$, below which the legs B, of which there may be three, are provided.

The handle, lid, and spout of the pot show clearly enough in the drawing to need no further description.

C is what I call my "steamer," a receptacle of any suitable shape, capable of being used for boiling water on a stove. An ordinary tea-kettle will answer the purpose if the lid be constructed as the lid D is shown—that is, with a tapering spout, $d$—to fit the inside of the tube E, so that the generated steam may be admitted to this tube. The steamer should have handles $c\,c$.

To the bottom of the coffee-pot the upper rim of the cylindrical chamber F is soldered, and to the bottom of this chamber, in the center, the vertical tube E is soldered, so that the coffee-pot, chamber F, and tube E are firmly held together without leakage at the joints. The liquid coffee will not be allowed at any time to rise above the upper end of the tube E, otherwise it would pass back into the steamer, to prevent which, however, there is provided a little hinged flap-valve, $e$, which also serves to prevent the impregnation of the water in the steamer with the odor of the coffee. This valve may be dispensed with if care is taken always to remove the coffee-pot from off the steamer when the apparatus is removed from off the stove, for it is only when the temperature of the water in the steamer is less than the coffee-water in the pot that the coffee-vapors descend the tube E. The chamber H has a lid or cover, H', on top, with a pipe-handle, I, to lift it off and put it on by. The lid is perforated with holes, as shown.

J is a false bottom, also perforated with small holes, and K is a removable bottom with an annular rim, $k$, punched through, so as to allow the water from the chamber F to find a passage into the chamber H from below.

To the false bottom J there is soldered a tube, L, open at the bottom but closed at the top, which extends to just a trifle above the top of the tube E.

The action is as follows: The steamer is partly filled with water and placed upon the stove. The chamber H is then charged with the proper amount of ground coffee, and the lid H' is put on. The coffee-chamber is then placed within the pot and the pot is closed. The coffee-pot is then placed over the steamer upon the stove, when soon the steam will form and, passing upward through the tube E, will return down the tube L, condensing in its passage. At first, condensation will take place early or at near the top of the tubes, but as soon as the outer water becomes warm the steam will pass into and entirely through the ground coffee before condensation is entirely effected. Thus will the essence of the coffee be most thoroughly extracted, the operation continuing until this is effected. The bottom lid, K, is used to insure that the steam passing down between the inner and outer tubes, E and L, will be guided to return upward through the coffee.

What I claim as my invention, and desire to secure by Letters Patent, is as follows:

An apparatus for brewing coffee, consisting of the steamer C and brewing-pot A, having the tubes E and L, chamber F, and chamber H with the perforated bottom J and perforated lid H', constructed, arranged, and operating substantially as herein described, and for the purpose set forth.

TYRE A. BYLER.

Witnesses:
GEORGE PARDY,
WM. HOWE.